UNITED STATES PATENT OFFICE.

JOHN B. EKELEY AND WILLIAM B. STODDARD, OF BOULDER, COLORADO.

METHOD OF OBTAINING PURE TUNGSTATES.

1,322,485.   Specification of Letters Patent.   Patented Nov. 18, 1919.

No Drawing.   Application filed March 21, 1919.  Serial No. 284,163.

*To all whom it may concern:*

Be it known that we, JOHN B. EKELEY and WILLIAM B. STODDARD, of Boulder, in the county of Boulder, and in the State of Colorado, have invented a certain new and useful Improvement in Methods of Obtaining Pure Tungstates, and do hereby declare that the following is a full, clear, and exact description thereof.

Our invention relates particularly to the treatment of ores containing tungsten so as to separate impurities from the same and to obtain the tungsten in the form of a pure salt of tungstic acid, which is free from the undesirable impurities.

The object of our invention is to provide a process by means of which it is possible to invariably and equally obtain pure tungstates by the treatment of various ores containing tungsten, and by means of which the undesirable impurities are readily eliminated.

A further object is to invariably and expeditiously remove the phosphorus and arsenic from solutions containing tungstates.

Further objects of our invention will appear from the detailed description thereof contained hereinafter.

The present invention is an improvement upon the invention set forth in our application upon Process of obtaining tungstates, Serial No. 106,358, filed June 28th, 1916, and our application upon Process for obtaining pure tungstates, Serial No. 184,831, filed August 7th, 1917.

While our invention is capable of being carried out in many different ways, for the purpose of illustration we have described only one example of the same herein.

For example, an ore containing tungsten as for example wolframite, hubnerite, ferberite, scheelite, tungstite, etc., is crushed, sampled, and ground in any suitable manner, by any one of the well known methods, to a suitable degree of fineness. The degree of fineness may vary to some extent with the nature of the ore, as for example, the facility with which it subjects itself to the succeeding treatments in the process. The ore is then mixed with sodium chlorid, sodium carbonate, and if found desirable, some silica. An amount of sodium chlorid is added, preferably from two-fifths to the same in weight as the weight of the ore. An amount of the sodium carbonate is added sufficient to combine with all of the tungstic acid and leave in addition an excess of the sodium carbonate. Sufficient silica is ordinarily added to combine with the excess of sodium carbonate so as to produce an insoluble silicate preferably containing sodium oxid and silicon dioxid in the proportions of one to four. Some ores, however, do not require the addition of any silica for this purpose, and in working with such ores the silica is omitted. If desired, sodium nitrate or sodium chlorate may be added to the mixture to provide oxidizing agents in the bath when fused. Instead of sodium chlorid, we may use sodium fluorid or calcium chlorid or fluorid. The charge is then fused in a suitable furnace. After the bath of fused materials has been allowed to cool, it will be found that the solid materials will have become separated into a water soluble portion and a water insoluble portion, the tungstic acid being contained in the form of a sodium tungstate in the water soluble portion. The solid mass is crushed and then extracted with water, for example, 4000 pounds of melt to 8000 pounds of water and is then filtered. The filtrate contains a clear solution of sodium tungstate, containing impurities including small amounts of compounds containing phosphorus and arsenic. The sodium tungstate solution is then heated, and an amount of a soluble magnesium salt, such for example as magnesium chlorid or magnesium nitrate, is added in excess of the amount that is necessary to precititate the acid magnesium phosphate, $MgHPO_4$, and to provide a sufficient quantity of the magnesium salt to indicate the presence of a soluble magnesium salt when tested by the ammonium magnesium phosphate test. As one example, I may add to 5000 gallons of the sodium tungstate solution 150 pounds of magnesium chlorid. The solution carrying the precipitated acid magnesium phosphate thus obtained is then brought to the boiling point. While at this temperature there is added a liquid thereto which is made by the addition of ammonia to a solution of a hypochlorite in the proportion of 15 gallons of the liquid to 5000 gallons of the solution containing the sodium tungstate. Said liquid is preferably prepared by adding 14 pounds of bleaching powder to 15 gallons of water while cold, then adding to the same 6 pounds of sodium carbonate or a similar compound, such for example as sodium bicarbonate, potassium carbonate, potassium bicarbonate or sodium, or potassium sulfate. This forms in the case of the addition of sodium compounds, sodium hypochlorite. The sodium hypochlorite solution is thoroughly stirred, and 15 gallons of the supernatant liquor containing the sodium hypochlorite as well as some calcium salts in solution are strained through a coarse sieve and added to 12 pounds of concentrated commercial ammonia containing about 27 per cent. of ammonia gas. The liquid thus obtained and which is provided for addition to the sodium tungstate solution, is added to the latter immediately after the liquid is prepared. This deposits invariably and at once all or all but a trace of the phosphorus and arsenic that is contained in the sodium tungstate solution. The precipitate obtained contains among other constituents ammonium magnesium phosphate, the corresponding arsenic compound and some calcium compounds. In addition the precipitate contains some calcium and some sodium tungstate, inasmuch as the precipitate is of a gelatinous character and cannot be readily freed from soluble materials. The sodium tungstate, however, is recovered by passing the sludge through a filter press, removing the wet solid material from the filter, partially drying the same in the sun or a warm room, adding this to a fresh quantity of tungsten-containing ore, and treating the resulting mixture in accordance with the same process as above described in connection with the treatment of the tungsten ore. Any proportion of the filtered sludge may be added to any proportion of the fresh tungsten-containing ore. The sludge obtained from the treatment of this mixed material may be again added to a fresh quantity of tungsten ore for treatment again in the manner above described. In this way, the process may be carried out continuously with the recovery of all of the tungsten. At the same time the amount of the phosphorus and arsenic in the sludge does not increase for the reason that the slag carries away the bulk of the phosphorus and arsenic in the materials treated. The hypochlorite solution serves as an oxidizing agent, and instead of the same some other oxidizing agent may be used, if desired, also instead of the calcium compounds, we may use barium or strontium compounds. Except for the sodium chlorid present and small amounts of carbonates and sulfates, the resulting solution is a substantially pure solution of sodium tungstate freed from all but minute traces of phosphorus and arsenic. If desired, the tungstate may be recovered as calcium tungstate by adding thereto a quantity of calcium chlorid or calcium hydroxid in excess of the amount required to replace the sodium in the sodium tungstate.

While we have described our invention above in detail, we wish it to be understood that many changes may be made therein without departing from the spirit of our invention.

We claim:

1. The process which comprises treating a solution of a tungstate to remove an element of the phosphorus group by adding a salt of an alkaline earth metal adapted to form an insoluble salt with an acid containing said element, an oxidizing agent and ammonia.

2. The process which comprises treating a solution of a tungstate to remove an element of the phosphorus group by adding a salt of magnesium adapted to form an insoluble salt with an acid containing said element, an oxidizing agent and ammonia.

3. The process which comprises treating a solution of a tungstate to remove an element of the phosphorus group by adding a salt of an alkaline earth metal adapted to form an insoluble salt with an acid containing said element, sodium hypochlorite and ammonia.

4. The process which comprises treating a solution of a tungstate to remove an element of the phosphorus group by adding a salt of magnesium adapted to form an insoluble salt with an acid containing said element, sodium hypochlorite and ammonia.

5. The process which comprises treating a solution of a tungstate to remove phosphorus by adding a salt of an alkaline earth metal adapted to form an insoluble salt with an acid containing phosphorus, an oxidizing agent and ammonia.

6. The process which comprises treating a solution of a tungstate to remove phosphorus by adding a salt of magnesium adapted to form an insoluble salt with an acid containing phosphorus, an oxidizing agent and ammonia.

7. The process which comprises treating a solution of a tungstate to remove phosphorus by adding a salt of an alkaline earth metal adapted to form an insoluble salt with an acid containing phosphorus, sodium hypochlorite and ammonia.

8. The process which comprises treating a solution of a tungstate to remove phosphorus by adding a salt of magnesium adapted to form an insoluble salt with an acid containing phosphorus, sodium hypochlorite and ammonia.

9. The process which comprises making a fusion of a tungsten ore, and a bath containing an alkali and a compound of an alkali forming element that is a solvent of the alkali when fused, dissolving out the tungstate, precipitating an element of the phosphorus group therefrom, and then adding the precipitate to a further quantity of the tungsten ore and recovering the tungsten from the precipitate and tungsten ore by treatment of the same as above specified for the initial quantity of tungsten ore.

10. The process which comprises making a fusion of a tungsten ore, and a bath containing sodium carbonate and a compound of an alkali forming element that is a solvent of the alkali when fused, dissolving out the tungstate, precipitating an element of the phosphorus group therefrom, and then adding the precipitate to a further quantity of the tungsten ore and recovering the tungsten from the precipitate and tungsten ore by treatment of the same as above specified for the initial quantity of tungsten ore.

11. The process which comprises making a fusion of a tungsten ore, and a bath containing an alkali and a halid of an alkali forming element that is a solvent of the alkali when fused, dissolving out the tungstate, precipitating an element of the phosphorus group therefrom, and then adding the precipitate to a further quantity of the tungsten ore and recovering the tungsten from the precipitate and tungsten ore by treatment of the same as above specified for the initial quantity of tungsten ore.

12. The process which comprises making a fusion of a tungsten ore, and a bath containing sodium carbonate and a halid of an alkali forming element that is a solvent of the alkali when fused, dissolving out the tungstate, precipitating an element of the phosphorus group therefrom, and then adding the precipitate to a further quantity of the tungsten ore and recovering the tungsten from the precipitate and tungsten ore by treatment of the same as above specified for the initial quantity of tungsten ore.

13. The process which comprises making a fusion of a tungsten ore, and a bath containing an alkali and chlorid of sodium that is a solvent of the alkali when fused, dissolving out the tungstate, precipitating an element of the phosphorus group therefrom, and then adding the precipitate to a further quantity of the tungsten ore and recovering the tungsten from the precipitate and tungsten ore by treatment of the same as above specified for the initial quantity of tungsten ore.

14. The process which comprises making a fusion of a tungsten ore, and a bath containing sodium carbonate and chlorid of sodium that is a solvent of the alkali when fused, dissolving out the tungstate, precipitating an element of the phosphorus group therefrom, and then adding the precipitate to a further quantity of the tungsten ore and recovering the tungsten from the precipitate and tungsten ore by treatment of the same as above specified for the initial quantity of tungsten ore.

15. The process which comprises treating a solution of a tungstate to remove an element of the phosphorus group by adding a salt of an alkaline earth metal adapted to form an insoluble salt with an acid containing said element, an oxidizing agent and ammonia, thus forming a precipitate, making a fusion of the precipitate with a bath containing an alkali and a compound of an alkali forming element that is a solvent of the alkali when fused.

16. The process which comprises treating a solution of a tungstate to remove an element of the phosphorus group by adding a salt of magnesium adapted to form an insoluble salt with an acid containing said element, an oxidizing agent and ammonia, thus forming a precipitate, making a fusion of the precipitate with a bath containing an alkali and a compound of an alkali forming element that is a solvent of the alkali when fused.

17. The process which comprises treating a solution of a tungstate to remove an element of the phosphorus group by adding a salt of an alkaline earth metal adapted to form an insoluble salt with an acid containing said element, sodium hypochlorite and ammonia, thus forming a precipitate, making a fusion of the precipitate with a bath containing an alkali and a compound of an alkali forming element that is a solvent of the alkali when fused.

18. The process which comprises treating a solution of a tungstate to remove an element of the phosphorus group by adding a salt of magnesium adapted to form an insoluble salt with an acid containing said element, sodium hypochlorite and ammonia, thus forming a precipitate, making a fusion of the precipitate with a bath containing an alkali and a compound of an alkali forming element that is a solvent of the alkali when fused.

19. The process which comprises treating a solution of a tungstate to remove an element of the phosphorus group by adding a salt of an alkaline earth metal adapted to form an insoluble salt with an acid containing said element, an oxidizing agent and ammonia, thus forming a precipitate, making a fusion of the precipitate with a bath containing sodium carbonate and sodium chlorid that is a solvent of the alkali when fused.

20. The process which comprises treating a solution of a tungstate to remove an element of the phosphorus group by adding a salt of magnesium adapted to form an insoluble salt with an acid containing said element, an oxidizing agent and ammonia, thus forming a precipitate, making a fusion of the precipitate with a bath containing sodium carbonate and sodium chlorid that is a solvent of the alkali when fused.

21. The process which comprises treating a solution of a tungstate to remove an element of the phosphorus group by adding a salt of an alkaline earth metal adapted to form an insoluble salt with an acid containing said element, sodium hypochlorite and ammonia, thus forming a precipitate, making a fusion of the precipitate with a bath containing sodium carbonate and sodium chlorid that is a solvent of the alkali when fused.

22. The process which comprises treating a solution of a tungstate to remove an element of the phosphorus group by adding a salt of magnesium adapted to form an insoluble salt with an acid containing said element, sodium hypochlorite and ammonia, thus forming a precipitate, making a fusion of the precipitate with a bath containing sodium carbonate and sodium chlorid that is a solvent of the alkali when fused.

In testimony that we claim the foregoing we have hereunto set our hands.

JOHN B. EKELEY.
WILLIAM B. STODDARD.

Witnesses:
GRACE M. MOORE,
IRA M. DE LONG.